May 3, 1932. G. A. SCHETTLER 1,856,139
MACHINE FOR PLATING AND EMBOSSING LEATHER
Filed Jan. 19, 1928 6 Sheets-Sheet 1

*Fig. 1*

Inventor
Gustav A. Schettler
By his Attorney
Nelson Howard

May 3, 1932. G. A. SCHETTLER 1,856,139
MACHINE FOR PLATING AND EMBOSSING LEATHER
Filed Jan. 19, 1928 6 Sheets-Sheet 4

Fig.4

Inventor
Gustav A. Schettler
By his Attorney,
Nelson N. Howard

Patented May 3, 1932

1,856,139

UNITED STATES PATENT OFFICE

GUSTAV ADOLF SCHETTLER, OF LEEDS, ENGLAND, ASSIGNOR TO THE TURNER TANNING MACHINERY COMPANY, OF PORTLAND, MAINE, A CORPORATION OF MAINE

MACHINE FOR PLATING AND EMBOSSING LEATHER

Application filed January 19, 1928, Serial No. 247,875, and in Great Britain January 27, 1927.

This invention relates to machines for operating on hides, skins, leather and other similar pieces of work and, as illustrated, is embodied in a machine for smooth plating and embossing pieces of leather. It is to be understood, however, that the invention and various important features thereof may have other applications and uses, such, for instance, as in presses of general utility.

As heretofore constructed, machines for smooth plating and embossing leather have commonly comprised two platens having pressure applying surfaces of considerable area and designed to effect a plating or embossing operation upon the whole surface of a piece of leather or upon a very considerable portion thereof upon relative approaching movement of the two platens in a direction normal to the surfaces of both platens. Because of the size of the platens these presses are tremendously heavy and are among the largest and most costly of the machines employed in leather manufacturing plants. Moreover, since any given piece of work must be spread out upon the lower platen and the operator's hands withdrawn before starting the machine, it frequently happens that, in spite of the efforts of the operator in spreading and smoothing out the work, folds and creases in the edges of the pieces of leather reappear or persist to such an extent that many of them are set in the finished work, thereby reducing the value of the plated or embossed piece of leather. Because of this refractory quality of the work the operator is tempted to smooth out a fold or crease after the press has been started in operation. As a result many serious accidents have happened through the fingers or hands of the operator being caught between the platens. Such presses as a consequence have been complicated by the provision of guards and other so-called safety devices for preventing the operator's hands from being introduced between the platens after the press has started, or for ejecting the operator's hands from the space between the platens as soon as the latter begin their approaching movement. For plating or ironing pieces of leather machines of the roller type have also been employed. While such machines require far less power during operation than do the platen machines and are safer for the operator, they do not accomplish as good results in embossing and in plating operations as do the platen machines and are much too expensive to build for embossing leather. While it has heretofore been proposed to utilize oscillatory segmental presser members for smooth plating and embossing of leather, no provision was made in such machines for fine adjustment of the presser members to variations in the thickness dimension of each piece of work treated in the machine. Furthermore, there was apparently no conception of the great importance in smooth plating operations and of the absolute necessity in embossing operations, of preventing relative slipping movement between the pressure applying surfaces of the presser members, since no adequate provision was made for keeping the presser members moving in unison during both their oscillatory movements and their self-adjusting movements to accommodate variations in the thickness dimension of each piece of work.

It is an object of this invention to provide an improved machine for the plating and embossing of leather which will obviate the disadvantages inherent in prior constructions. It is a particular object of the invention to provide a machine which will be especially serviceable in the quality and quantity of the work produced and which will be highly responsive to control by the operator with a high degree of safety to the latter.

To these ends, and in accordance with an important feature of the invention, means is provided, in the illustrated leather plating and embossing machine, for pivotally mounting a pair of co-operating segmental presser members to yield relatively to each other, at a point back of the pivotal mounting of one of the presser members to accommodate variations in the thickness dimension of each piece of work treated by them, whereby each and every portion of the piece of work receives adequate pressure and practically uniform treatment. In a machine so organized it is of the utmost importance that no slipping take place between the pressure applying surfaces of the presser members during treatment of the work. Accordingly, improved means is provided for connecting the presser members together to cause them to move in unison and to prevent backlash or other relative slipping movement between the pressure applying surfaces of the members while they are operating on the work. Conveniently, and as illustrated, the connecting means comprises inextensible but flexible cables arranged to connect a front edge portion of one segmental presser member and a rear edge portion of the co-operating segmental member. This cross connection of the flexible cables permits them to move toward and away from each other in accommodating variations in the thickness dimensions in the pieces of work without disturbing the positive connection between the segmental presser members afforded by the cables serving as inextensible connecting members.

In order to secure heavy pressure on the pieces of work with a small expenditure of power, one of the presser members is arranged to be hydraulically operated in a direction toward the other to effect the application of pressure on a piece of work between the presser members during oscillatory movement of the members. Conveniently, the upper presser member is provided with a mounting movable through the application of power from the hydraulic means so that its associated presser member may be forced toward the other presser member with the requisite pressure, this construction providing also for the described relative yielding of the presser members to accommodate variations in the thickness of the piece of work undergoing treatment. In thus constructing and arranging the yielding mounting for one of the presser members there is avoided any change in the length of the radius of the two oscillatory presser members, thereby providing a structure which contributes to the effectiveness of the smooth plating and embossing operations since in these operations no relative slipping movement between the two pressure surfaces should take place such as would be caused by moving one surface about a longer radius than the other.

Preferably and as shown, for controlling the application of pressure to one of the segmental presser members to move it in a direction toward the other segmental presser member, the press is provided with means so arranged that the pressure is not applied at the very beginning of the rolling contact between the work and the two pressure applying surfaces of the segmental members. Conveniently, one of the rotary presser members is arranged to control the application of increased pressure to such presser member a predetermined time after the beginning of rolling contact between the presser members. In a preferred embodiment of the invention, the increased pressure on said presser member is released a predetermined time before the termination of the rotary movement of one of the rotary presser members. As illustrated, said rotary presser member is provided with a cam for controlling a valve in a hydraulic mechanism for applying pressure to the rotary presser member after the start of its rotary movement. In this way, marking or other injury to the piece of work placed between the presser members is avoided and there is less wear and tear on the presser members. It is to be understood that this feature of control of pressure upon one of the presser members is not to be limited to a construction in which both presser members are rotary or to one in which the increased pressure is effected by hydraulic means.

Another important feature of the invention relates to improved means for controlling the operation of the presser members from both front and rear of the machine to facilitate the employment of two operators, one at each side of the machine, the illustrated construction and arrangement being such that a normally manually operable controlling member at one side of the machine is locked while a similar member at another side of the machine is free to be manipulated by an operator on that side of the machine to effect starting thereof, and vice versa, the said means comprising a locking rod shiftable endwise to engage alternately with the two manually operable members. Conveniently, the shiftable locking rod is automatically controlled by one of the presser members during the pressure applying movements of the latter. This construction contributes to the safety of the operators since normally only one operator at a time may start the machine in operation. To add further to the security of the operators means is preferably provided for stopping the machine practically instantaneously at any point in its operation, the said means being readily accessible for operation by either operator. Also, as illustrated, while either operator is able to start the machine in operation it comes to rest automatically at the end of the pressing operation through clutch operating means controlled by one of the presser members.

These and other features of the invention and novel combinations of parts will be described in detail in the specification and set forth more particularly in the appended claims.

In the drawings,

Fig. 7 is drawn to a larger scale than the remaining figures.

Figure 1:
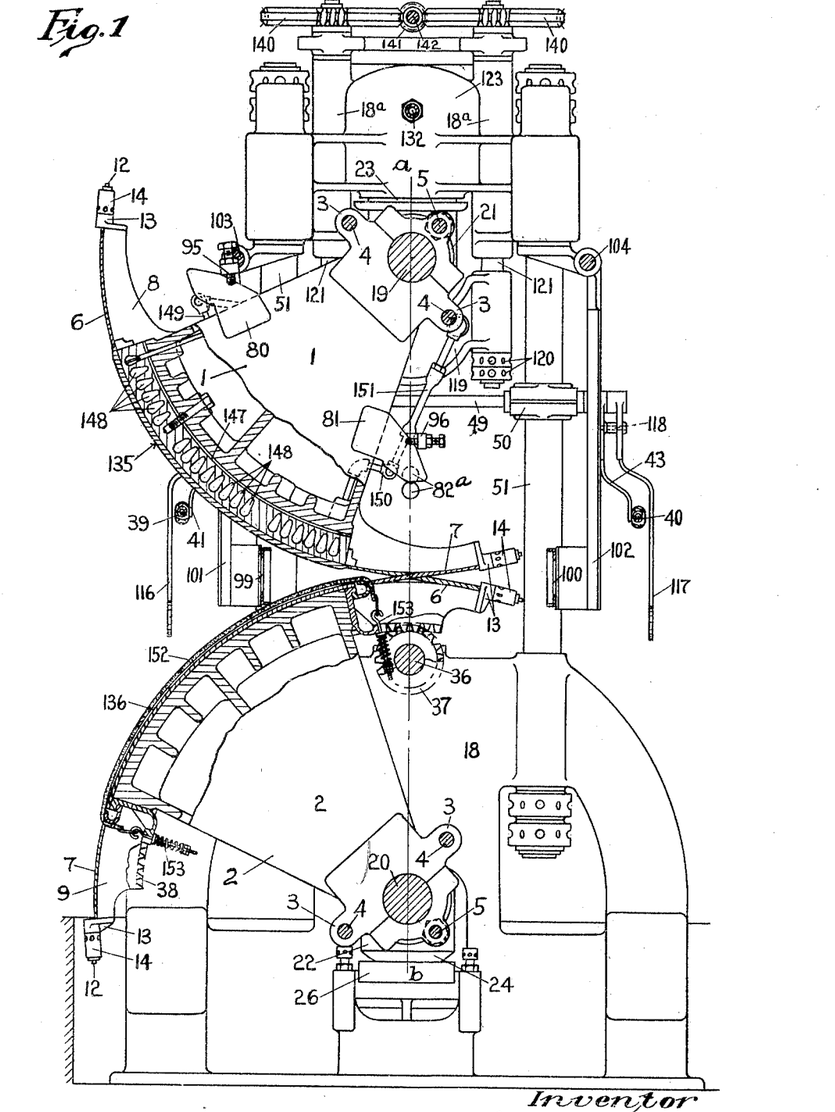
Figure 1 is a sectional end elevation of a plating and embossing machine constituting a preferred embodiment of the invention.
Figure 7:
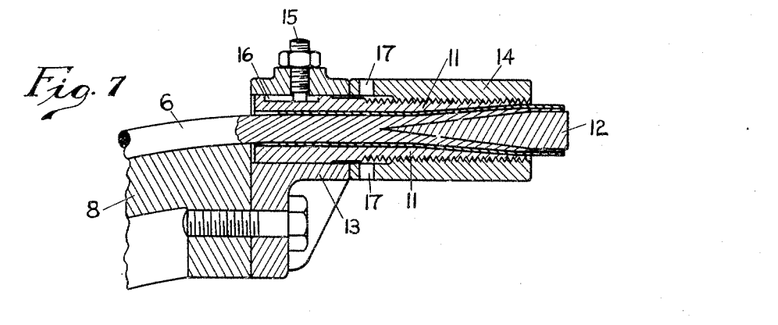
Fig. 7 is a detail section of a cable anchorage.

The machine herein disclosed is designed particularly for plating and embossing hides, skins, leather, or other work embodies upper and lower presser segments 1 and 2 having arcuate pressure applying surfaces between which the work is treated. According to the width of the machine, each presser segment may consist of a single unit or section or it may be built up of a number of adjacent sections 1a, 1b, 1c and 2a, 2b, 2c, as indicated in Figs. 3 and 4 bolted or otherwise fastened together. Conveniently, said sections are formed with lugs or bosses 3 (Fig. 1) for the reception of connecting rods 4 whereby they are connected laterally and therefore oscillate in unison. Similar auxiliary connections, the rods 5 of which are shown in Fig. 1, may be provided between the two outer sections 1a, 1c of the upper segment 1 and between sections 2a, 2c of the lower segment 2. The opposing presser segments are tied together at the ends of the machine by means of two sets of flexible but substantially inextensible cables 6 and 7 respectively, (see Figs. 1, 2 and 3) winding upon and unwinding from arcuate surfaces rigid with the segmental presser members. In the illustrated arrangement, the presser segments have circular cylindrical presser surfaces, and the outer sections 1a, 1c and 2a, 2c, of the segments have quadrants 8 and 9 (Figs. 3 and 4) attached thereto to which the cables are anchored, the cables being located in peripheral circular grooves 10 in the quadrants. Thus cables 6 are anchored to one end of the quadrant 8 in the upper segment and to the remotely or non-corresponding opposite end of the quadrant 9 in the lower segment, while the cables 7 are similarly anchored to the other ends of the quadrants. As shown in Fig. 1, the two sets of cables cross each other on the line of pressure, i. e. on the line a—b (Fig. 1) intersecting the centers about which the segments oscillate, the two segments being thus tied directly together against movement relative to each other in either direction to the front or rear of the machine by these flexible members which do not interfere in any way with the oscillating movements of the segments. The word "directly" as here used means that the cables are attached to the segments or to members which are connected to move with the segments, respectively. Preferably, and as shown, inextensible steel cables are used and these have at their ends screw and nut devices for engagement with members on the quadrants whereby the cables can be tensioned and adjusted. That is to say each cable has each of its ends inserted into a screwed sleeve 11 (Fig. 7), the bore of which is tapered at one end, and at tapered plug 12 is driven into the end of the cable to expand it in the sleeve. The sleeve fits adjustably in a bracket 13 attached to the quadrant 8 or 9, and is engaged by a nut 14 which abuts against the bracket 13 when the cable is tensioned. The sleeve is prevented from rotation in the bracket by a screw 15 which enters a recess 16 in the sleeve and the cable is tensioned and adjusted by rotating the nut for which purpose the latter is provided with spanner holes 17 for engagement by a suitable tool. In addition to connecting the segments 1 and 2 to prevent backlash and relative slipping movement between them, the cables serve to transmit movement from one segment to the other. As illustrated, the lower segment is oscillated by suitable means hereinafter described and imparts corresponding movement to the upper segment through the medium of the connecting cables, although both segments may be independently driven, if desired. The cables extend beyond the operative surfaces of the segments which latter may be of any convenient length circumferentially. They may, for example, extend about 90° (as shown) or they may be semi-circular, or may have a greater surface so that they form almost complete rollers, sufficient space being left in the circumferences for the anchored ends of the connecting cables.

Figure 2:
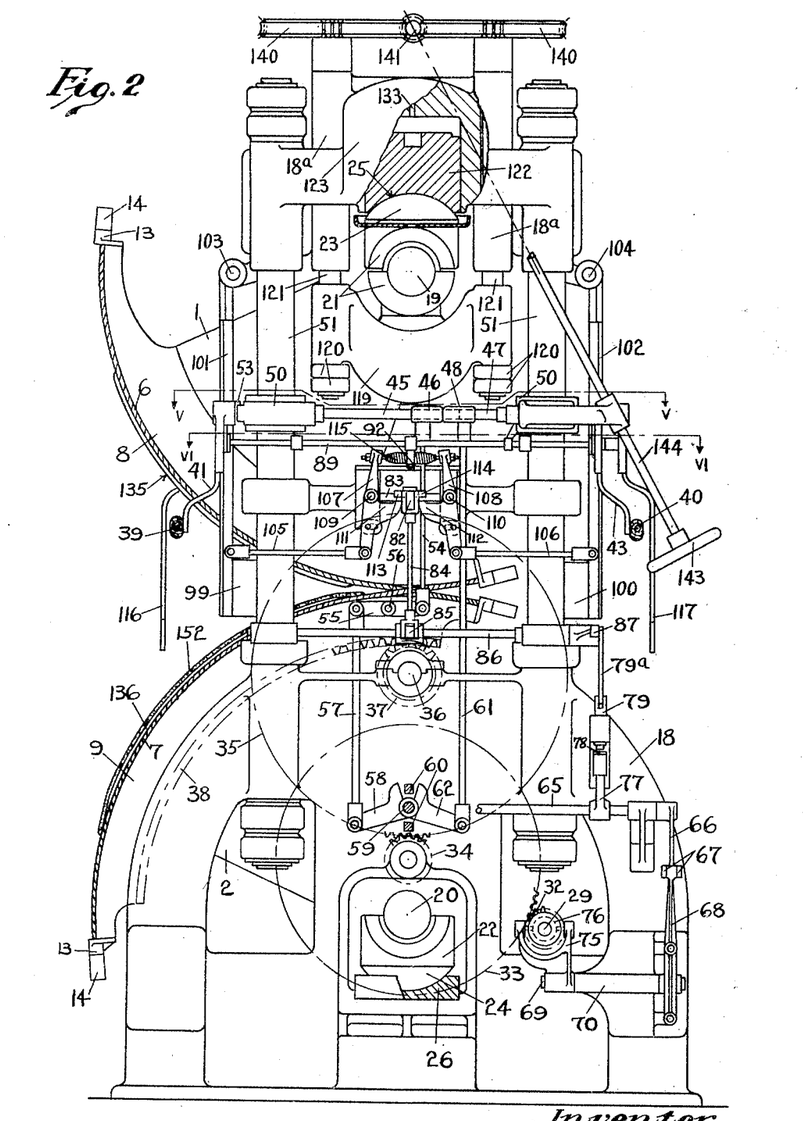
Fig. 2 is an end elevation, partly in section, of the machine showing more particularly clutch controlling connections hereinafter described.
Figure 3:
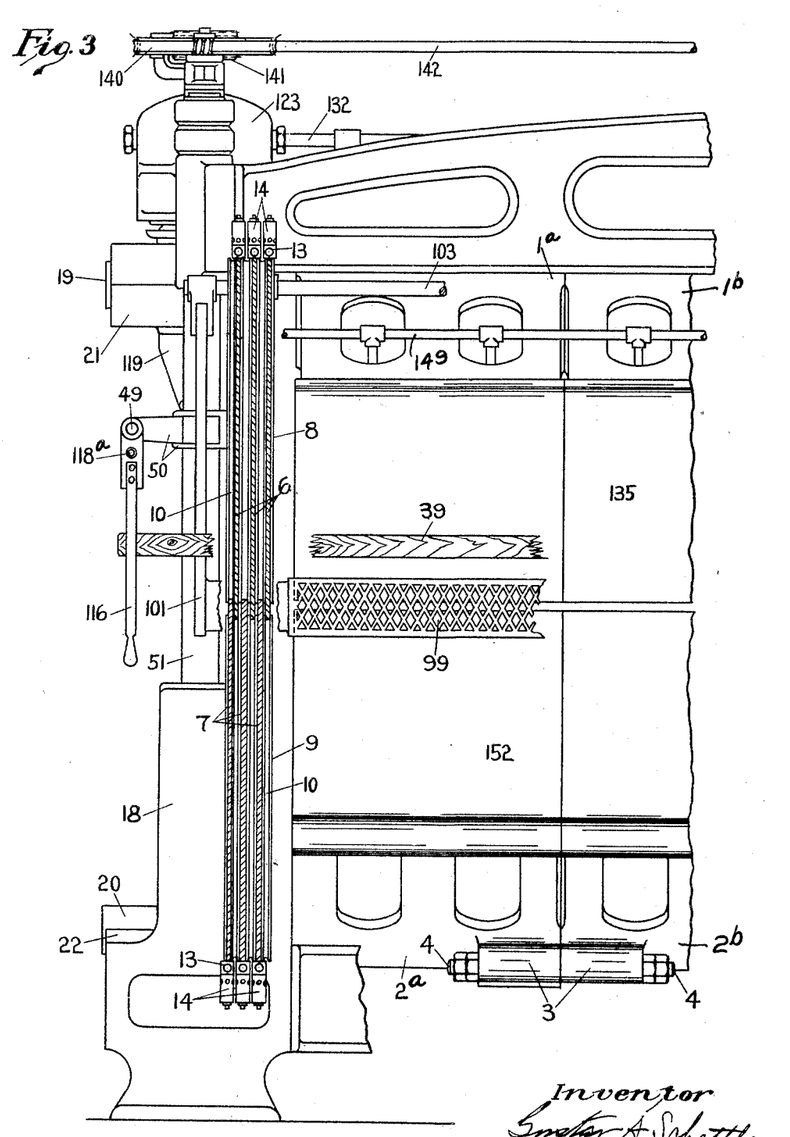
Fig. 3 is a front elevation of one end of the machine.
Figure 4:
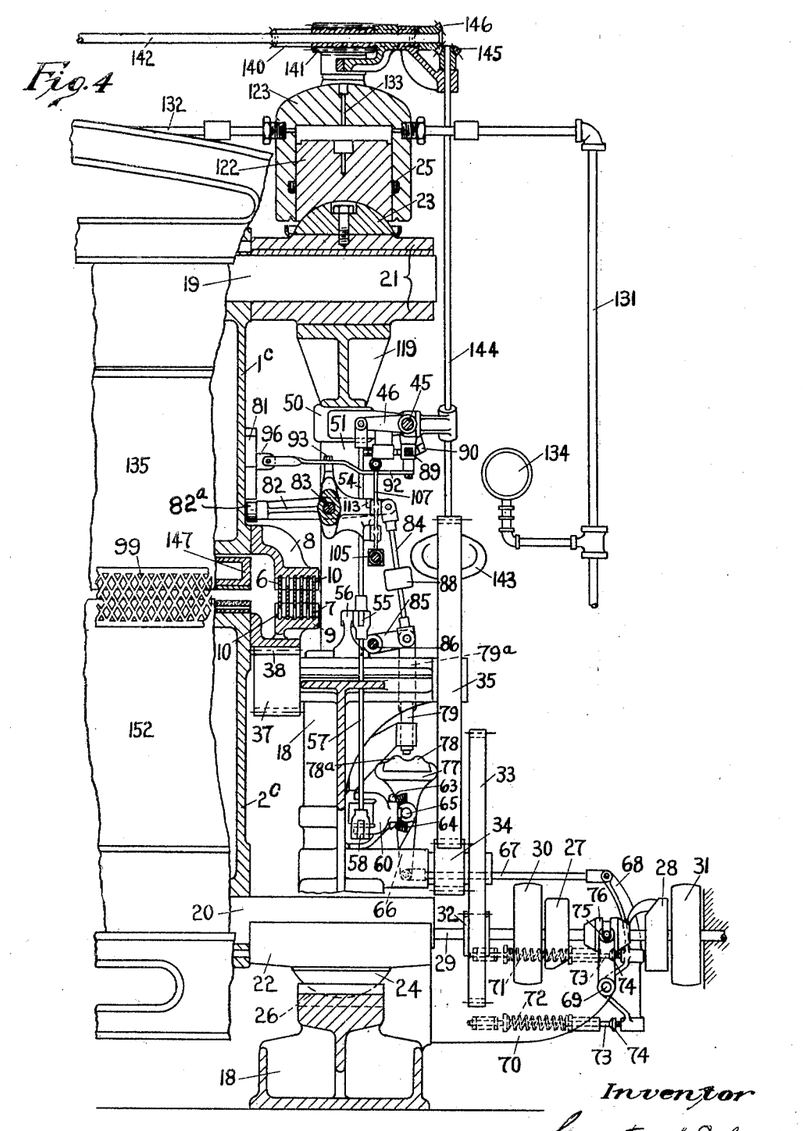
Fig. 4 is a sectional front elevation of the opposite end of the machine and includes the clutch mechanism and controlling connections.

The presser segments are mounted in machine frame 18 on shafts 19 and 20 carried by bearings 21 and 22 of the self-aligning type, i. e. provided with hemispherical or like parts 23 and 24 fitting in sockets 25 and 26 (Figs. 2, 3 and 4). The sockets 26 are suitably bedded in the machine frame. The bearings 23 and socket 25 are mounted in a manner more fully described later herein.

The oscillation of the presser segments may be brought about by any convenient means. As illustrated, there are provided at one end of the machine (Fig. 4) two clutches 27 and 28 mounted on a shaft 29 in association with two pulleys 30 and 31 driven by open and crossed belts (not shown) and arranged to transmit the drive from the shaft 29 through gearing (Fig. 2) 32, 33, 34, 35, to a shaft 36 furnished with a pinion 37 meshing with a rack 38 on the adjacent quadrant 9. These clutches are controlled by manually operable levers and connections for starting the operation of the segments while for stopping the segments, the clutches are thrown out by connections actuated automatically. To this end the driving mechanism and controlling means include, as will be hereinafter more specifically described, spring means for putting the clutches out of action, a rocking device operable by starting members for co-operation with a draw bolt for holding each clutch in turn in operation, and connections between the draw bolt and means on one of the segments whereby said bolt is actuated to stop the machine. Emergency devices are preferably provided on opposite sides of the machine together with intermediate connections for operating the draw bolt when necessary to stop the machine. Braking means automatically actuated may be provided to arrest the movement of the segments upon declutching taking place. Further, said driving and controlling means preferably include an arrangement which enables the machine to be operated first on one side and then on the other, in which case two operators work the machine, one on each side. In that case, a skin is placed in the machine by the operator on one side, and upon being set in motion by this operator the presser segments draw the skin through the machine thereby pressing it and carrying it to the opposite side where the other operator removes it and places another in position after which he restarts the machine whereupon the presser segments move in the opposite direction and carry the skin through to the first operator.

Figure 5:
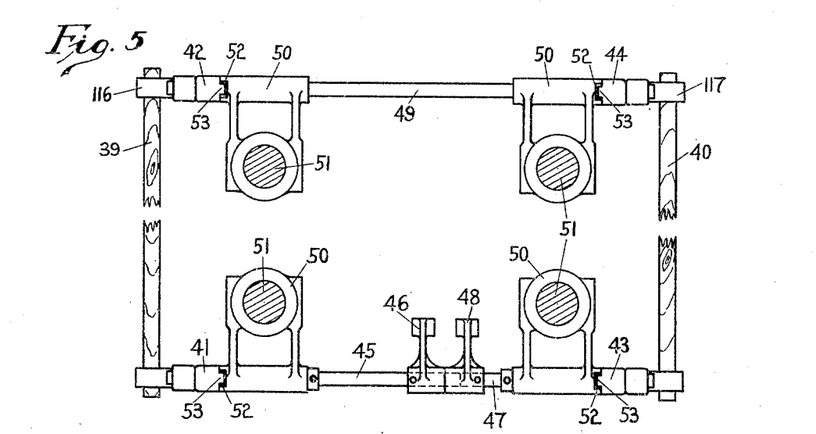
Fig. 5 is a sectional plan on line V—V of Fig. 2.

The starting arrangements on opposite sides of the machine are normally independent so that when the segments are on one side the machine cannot be started by the operator on the other side and vice versa. In the illustrated machine (Figs. 2, 4 and 5), two starting handles 39, 40 are provided on opposite sides of the machine, these being respectively pivotally attached to arms 41, 42, and 43, 44. The arm 41 is pinned on a rockshaft 45 having fast thereon an arm 46. Similarly the arm 43 is pinned on another rock shaft 47 in alignment with the first and having an arm 48 fast thereon. The arms 42 and 44 are freely mounted on opposite ends of a rock shaft 49 for a purpose hereinafter appearing. Thus, as will be observed, the two handles can be operated independently. The rock shafts 45 and 49 are carried by bearings 50 fixed upon the posts 51 of the machine frame and these bearings are provided with recesses 52 for the reception of projections 53 on the several arms 41—44, whereby movement of the starting handles is limited. The arm 46 (Figs. 2 and 4) is connected by a link 54, lever 55, pivoted at 56 and link 57 to a lever 58. This lever is fulcrumed on a stationary shaft 59 and constructed to work on one side of a bifurcated member 60 which is rotatable on the shaft 59. The arm 48 is in its turn connected by a link 61 to a lever 62 also fulcrumed on the shaft 59 but adapted to work on the side of the member 60 opposite to the corresponding lever 58. The member 60 (Fig. 4) is adapted to actuate, through the medium of bevel segments 63, 64, a rock shaft 65 fast on which is an arm 66 connected by a link 67 to a lever 68 mounted on rock shaft 69. The shaft 69 is carried rotatably by a bearing 70 attached to the machine frame, and having mounted thereon springs 71, 72 arranged to act upon the lever 68 on opposite sides of its fulcrum through the medium of push rods 73 and adjustable abutments 74, whereby said lever is held in a neutral position. A clutch fork 75 is fixed on the rock shaft 69 for engagement with a collar 76 slidable on the clutch shaft 29 between the clutches 27 and 28.

Now with the presser segments 1 and 2 in the positions illustrated in Figs. 1 and 2, when the starting handle 39 is swung in a direction towards the observer (i. e. to the right as viewed in Fig. 3) the lever 58 (Fig. 2) is operated through the described connections and rotates the bifurcated member 60 clockwise. This in turn actuates, through the intermediate described mechanism associated therewith, the lever 68 which is turned clockwise (as viewed in Fig. 4) against the action of the spring 72 so as correspondingly to move the clutch fork 75 which through the collar 76 puts the clutch 28 into operation. The presser segments 1 and 2 thereupon turn on their shafts 19 and 20 and eventually take up a corresponding position on the opposite side of the machine whereupon the clutch 28 is automatically released and the lever 68 (Fig. 4) is restored to its neutral position. The return movement of the presser segments is brought about by movement of the starting handle 40 in a direction opposite to that of the handle 39, i. e. away from the observer viewing Figs. 1 and 2, so that the lever 62 (Fig. 2) is actuated to turn the bifurcated member 60 counterclockwise whereupon the lever 68 (Fig. 4) is turned counterclockwise against the action of the spring 71 to put the clutch 27 into operation. As the presser segments take up the position shown in Figs. 1 and 2, the clutch 27 is automatically released and the lever 68 again resumes its neutral position.

Figure 10:
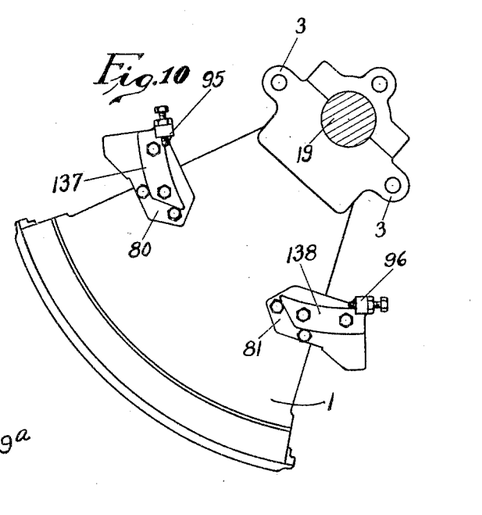
Fig. 10 is an end view of a segment fitted with cams for purposes hereinafter set forth.

Since each clutch is rendered operative against spring action, provision is made for holding it operative until such time as the presser segments reach the end of the given stroke. For this purpose there is fixed on the rock shaft 65 (Fig. 4) an arm 77 provided with shoulders 78, 78a and a draw bolt 79 for engagement with these shoulders alternately according to the direction in which the arm is turned when the rock shaft 65 is actuated as already described. The draw bolt 79 is automatically controlled by cams 80, 81, (Figs. 1, 4 and 10) on the upper presser segment 1, the arrangement being such that with the presser segments in the rest position at the end of either stroke one cam or the other is operative to hold the draw bolt 79 from engagement with the arm 77. Conveniently the cams 80, 81 operate through a lever 82 fulcrumed at 83 (see Fig. 4) and connected by a link 84 with an arm 85 on a rock shaft 86 which is also furnished with an arm 87 (see Fig. 2) to which the draw bolt 79 is suitably connected. It will be observed that when the presser segments 1 and 2 occupy the positions shown in Figs. 1 and 2, the cam 81 is operative (Fig. 1). That is to say, it is acting on a roller 82a on the lever 82 to hold the draw bolt inoperative. When the starting handle 39 is operated and the presser segments 1 and 2 commence to move, the lever 82 is freed so that the draw bolt falls behind the shoulder 78 (Fig. 4)—since the arm 77 has turned counterclockwise owing to the corresponding movement of the rock shaft 65—and thereby holds the clutch 28 operative. Consequently the lever 82 is tilted to bring the roller 82a into the path of the cam 80 (see the dotted position of the roller in Fig. 1), which as the presser segments reach the end of the stroke depresses the lever 82 and thereby withdraws the bolt to release the clutch. Upon movement of the starting handle 40 the bolt 79 is again freed, this time by the cam 80, so that it engages the shoulder 78a until such time as the cam 81 becomes operative, i. e. at the end of the return movement of the presser segments. The draw bolt 79 falls under the action of gravity supplemented by weight 88 on the link 84. Normally, therefore, the presser segments, after being started, complete their movement without stopping or reversing.

Figure 6:
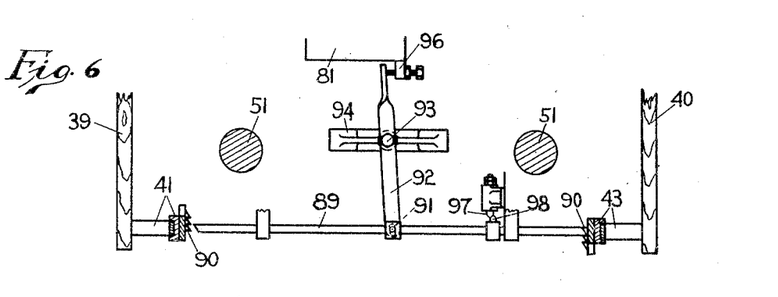
Fig. 6 is a sectional plan on line VI—VI of Fig. 2.

As hereinbefore indicated, means are furnished in conjunction with the starting mechanism which act so that normally each operator can make the presser segments move in only one direction, i. e. away from himself, thereby obviating the possibility of danger to the operator on the opposite side of the machine. Referring to Figs. 2, 4 and 6, such means conveniently comprise a detent device, constituted by a slide rod 89 beveled at its opposite ends and in opposite directions for co-operation with ratchet teeth 90 on the arms 41, 43 of the starting handles, the teeth on the respective arms being relatively oppositely disposed. The detent has a pin and slot connection 91 with a lever 92 pivoted centrally, as at 93 on a bracket 94 which also serves to carry the cam lever 82. The lever 92 is adapted for actuation by tappets 95, 96, carried respectively by the cams 80, 81, on the presser segment 1. According to the direction of movement of the presser segments 1 and 2, the detent rod 89 is actuated by the tappets 95, 96 to engage with the arms 41 and 43 alternately, the arrangement being that the detent rod 89 engages the arm on the side of the machine opposite to that to which the presser segments move. For example, when the segments take up the positions shown in Figs. 1 and 2, the tappet 96 causes the detent rod to engage the arm 43, (Fig. 6) on the other side of the machine so that the starting handle 40 is locked against operation, while the arm 41 is free and consequently the starting handle 39 can be operated. Conversely when the presser segments take up the opposite positions, the detent rod 89 is caused to engage the arm 41 thereby locking the starting handle 39 and freeing the handle 40. The detent rod 89 is locked in either of its positions during movement of the segments by a spring pressed catch 97 adapted to act on either side of a stop 98 on the detent rod according to the position of the latter. This catch is forcibly pressed back by the stop when the detent is moved by one or the other of the tappets as aforesaid.

To enable the machine to be stopped in case of necessity or accident, an emergency device is provided on each side, comprising members extending across the machine between the presser segments 1 and 2 and combined with suitable supporting and connecting means whereby upon being touched, e. g., by the hand or arm, they will move in the direction in which the work is traveling and automatically stop the machine. In the illustrated machine, fences 99, 100, are attached to arms 101, 102 pivotally mounted on shafts or rods 103, 104, on opposite sides of the machine. These fences 99, 100 are respectively connected by links 105, 106 with trip levers 107, 108 fulcrumed at 109, 110 on opposite sides of the lever 82 which is connected with the draw bolt 79 as already described. The levers 107, 108 are respectively furnished with arms 111, 112, which are located under shoulders 113, 114, on the lever 82, and are normally held inoperative by a common spring 115. If either of the fences is swung inwardly when the machine is working, the lever 82 is tilted by the action of the corresponding lever, i. e. 107, or 108, on the shoulder 113 or 114 and thereby operates the draw bolt 79 to permit the throwing out of which ever clutch (27 or 28) happens to be active by its associated spring. When the machine has been stopped in this manner by the actuation of a fence (99 or 100) on one side, and it is desired to return the presser segments 1 and 2 to initial position, as explained above, this can be done only by the operator on the other side, except as set forth below. A brake (not shown) of the well-known spring controlled contracting band type is preferably associated with the clutch shaft 29 and controlled by intermediate connections including a toggle motion from the rock shaft 69 on which the clutch fork 75 is mounted so as to be released and applied when either clutch is rendered operative and inoperative.

When it is desired to use the machine for small pieces of work, the starting means on opposite sides of the machine may be connected so that an operator can work the presser segments backward and forward as required. When such means are provided the locking detent 89 is, of course, dispensed with. Conveniently, and as shown, auxiliary handles 116, 117, (Figs. 1, 2 and 3) are fixed on the opposite ends of the rock shaft 49 and pins 118 (Fig. 1) are provided for insertion through holes indicated at 118a in these handles and in the arms 42 and 44 respectively whereby said handles and arms are connected together. Thus movement of either of the auxiliary handles 116, 117, first in one direction and then in the other puts the clutches 27 and 28 into action alternately.

For the purpose of applying the requisite heavy pressure to work passed between the presser segments 1 and 2, one segment is carried by movable bearings adapted to be subjected to pressure by hydraulic means, the application and release of pressure as well as the amount of pressure being under the control of the operator or operators, with a qualification to be explained. As illustrated, each of the bearings 21 (Figs. 2 and 4) of the upper presser segment 1 is carried in the machine frame by a beam 119 supported by screwed collars 120 on rods 121 slidable in the upper part 18a of the machine frame so that the upper presser segment 1 can be forced toward the lower segment to apply the required pressure to the work and also so that the segment 1 can yield away from segment 2 according to the thickness of the work. To force the upper segment toward the lower one, each bearing is acted upon by a ram 122 in which the socket 25 hereinbefore referred to its formed, such ram being located in a cylinder 123 in the said frame part 18a. The cylinders may be supplied with oil or other medium, e. g. water, from any convenient source, but preferably by the hydraulic apparatus described in the specification of my copending application Serial No. 247,876 filed Jan. 19, 1928. For the purposes of the present invention, the oil or other medium is supplied to the cylinders 123 at each end of the machine by pipes 131 and 132 (Fig. 4) through operation of a control valve C (Figs. 8 and 9) adapted to be operated from each side of the machine. As shown, a valve spindle 124 (Fig. 9) in the valve C is rotated by bevel gearing 125 from a rock shaft 126 furnished with manually operable handles 127, 128. Associated with the handles are sectors 129, 130 which serve to limit the movement of the handles or levers in either direction and to carry "On" and "Off" indications. When one or the other of the handles is turned to the "On" position pressure from the hydraulic system is transmitted through the pipe line 131 (Fig. 4) to the ram 122 at one end of the machine and by the pipe 132 (Figs. 1, 3 and 4) to the ram 122 at the other end. An air escape valve (not shown) is provided in a port 133 (Figs. 2 and 4) in each cylinder. A pressure gage 134 (Fig. 4) is provided in the pipe line 131. As heretofore stated, the bearings 22 and sockets 26 for the lower segment shaft 20 are bedded in the machine frame and are therefore unyielding. On the other hand, the bearings 21 for the upper segment shaft 19 may yield upwardly against the pressure of the liquid in the pipes 131, 132, since the pressure is within such reasonable limits as the experience of leather manufacturers in pressing and embossing operations has led them to accept as practical for different classes of leathers. It will, of course, be understood that the control valve C should be operated so that the pressure becomes effective and is relieved at appropriate times in relation to the movement of the segments 1 and 2. Control of the valve C may be effected through the manually operable handles 127, 128 for certain classes of work and particularly for small skins which do not extend the full width of the presser surfaces.

Figure 8:
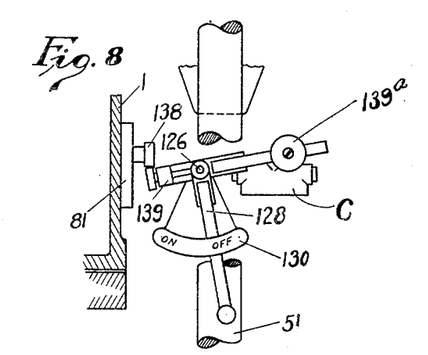
Fig. 8 is an elevation partly in section of pressure regulating gear hereinafter described.
Figure 9:
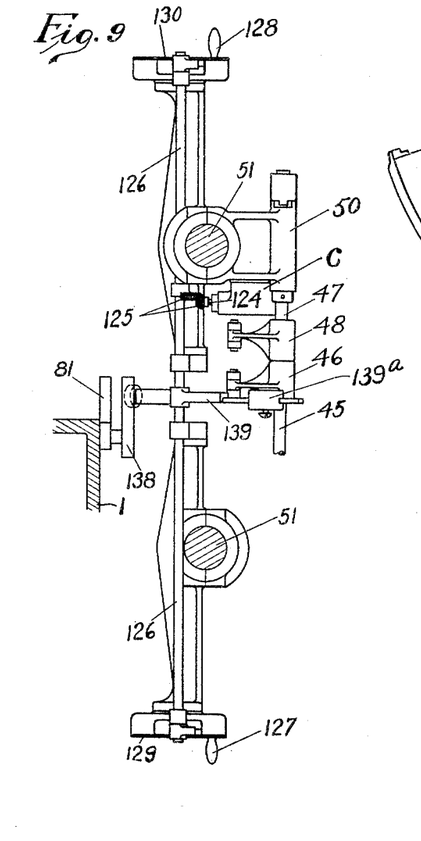
Fig. 9 is a plan of the pressure regulating gear shown in Fig. 8.

Means are also provided for controlling the pressure automatically, when the cooperating presser segments 1 and 2 first nip material which is practically coextensive with the pressure applying surface of the presser segments, at the beginning of their movement and when they release such material at the end of their movement, said means acting for the purpose of obviating undesirable pressure on the material as the front and rear ends of the working surfaces 135, 136 of the segments act on the material. Conveniently I provide cams 137, 138, (Fig. 10) on the upper segment and a counterweighted (or spring controlled) lever 139 on the rock shaft 126. The construction and arrangement is such that according to the position of the segments either the cam 137 or the cam 138 normally holds the lever 139 depressed against the pressure of the weight 139a, as represented in Fig. 8, i. e. with the control valve in the "Off" position and the pressure relieved, and, moreover, holds the lever in this position for a short time after the segments have been started so that the leading edge of the skin is prevented from being pinched between the corresponding edges of the working surfaces and consequently undesirably marked. Upon release by the cam (137 or 138) the lever 139 is actuated by its weight 139a to bring about the application of the pressure from the hydraulic system. As the presser segments approach the end of the stroke, the other of the cams 137, 138 depresses the lever 139 in time to prevent the trailing edge of the work from being pinched between the corresponding edges of the working surfaces of the presser segments. Since the cam 137 or 138 releases the lever 139 very shortly after the starting of the oscillatory swing of the segment 1, the said lever is free for manual control through the levers 127, 128 throughout the greater part of the oscillatory movement of the segments. Hence, the operator may keep the pressure "Off" for a longer time than would be the case under automatic control by either of the cams 137, 138. This might be done as heretofore explained in case small skins are being operated on. Moreover, in any emergency, the pressure may be instantly released by the manual control.

Mechanical means such as worm gearing may be furnished for adjusting one of the presser segments 1 and 2, relatively to the other, this being more especially the case when the upper segment is hydraulically controlled as described, such adjustment moving the yielding segment up and down to vary its normal position for coarse adjustment to different classes of work. Conveniently for this purpose, the rods 121 at each end of the machine are respectively formed with right and left hand threads at their upper ends and are fitted with worm wheels 140, worms 141 being provided at opposite ends of a shaft 142 (Figs. 1, 2, 3, and 4) for engagement with the corresponding worm wheels. This shaft is rotated by means of a hand wheel 143, (Fig. 4) and a shaft through the medium of mitre gears 145, 146.

Either or both presser segments 1 and 2 may be designed for heating by steam or other suitable medium. For plating the upper segment 1 will carry a smooth surfaced plate, while for embossing the upper segment will have fixed thereto a plate having a design or pattern formed therein. As illustrated, the upper segment 1 is shown fitted with a steam box 147 (Fig. 1) formed with channels or conduits 148 to obtain even distribution of steam over the whole surface of the segment. This box is connected by means of pipe systems 149, 150 to steam and water supplies so that either steam or water can be circulated through the box to heat or cool the working surface of the segment according to requirements. The said pipe systems include expansion joints, one of which is represented at 151 to allow for the oscillating movement of the segment.

When the working surface of each presser segment 1 and 2 consists of a matrix, platen or the like applied to the segment, clamps, clips or other appropriate members are provided to secure the same in position preferably in a removable manner. For example, said matrix, platen or the like may be engaged by devices (not shown) constructed to tension it upon the face of the segment as well as to clamp it in position thereon. For certain classes of work a bolster apron or cover 152 (Fig. 1) may be used on the lower segment or on both segments and when provided is held stretched over the surface or surfaces by spring controlled hooks 153 (Fig. 1) at one or both edges of the segment.

In operating the illustrated machine, assuming that it has come to rest in the position shown in Fig. 2 of the drawings, a piece of work, such as a calf skin, is placed upon the circular cylindrical surface of the lower presser member 2 with the forward edge of the work far in between the two presser members 1 and 2. Then the operator on the open side of the machine, as illustrated in Fig. 2, utilizes the starting handle 39 to initiate a pressure applying operation. Operation of the handle 39 results in an oscillatory movement of both presser members 1 and 2 during which the piece of work is progressively acted upon during the rolling contact of the two segmental presser members. Because of this rolling contact with the work the operator may maintain control of the piece of work for the purpose of tensioning it to efface wrinkles or folds. When the segmental presser members reach a position toward the right in Fig. 2 similar to that which they occupied at the left in the same figure, the machine comes to rest through the operation of an automatically operated clutch shifting means controlled by the upper presser member, as already described. When the machine comes to rest with the presser members at the right in Fig. 2, the operator upon this side of the machine may remove the piece of work or shift it to a new position if it has not been completely operated upon, due to its size. After shifting this piece of work or removing it and inserting a fresh piece, this operator starts the machine by proper manipulation of the starting handle 40. As has heretofore been pointed out the handle 39 is locked against manipulation while the handle 40 is free for manipulation, and vice versa. Should an emergency arise, either operator may stop the machine by pressing upon an emergency control member or fence, one at each side of the machine, at 99 and 100. If small pieces of work are being operated upon the two bars or starting members 39 and 40 may be connected in the manner described in the foregoing description so that the operator at one side of the machine may control the oscillations of the segmental presser members.

Having described my invention, what I claim as new and desire to secure by Letters Patent of the United States is:

1. In a press, a pair of co-operating segmental presser members having arcuate pressure applying surfaces, said segmental members being mounted to turn about spaced parallel axes and having arcuate grooves, means for causing the segmental members to operate upon a piece of work, and means connecting the presser members to each other to cause them to move in unison during a pressure applying operation, said connecting means being receivable in said grooves and directly connected to the segmental presser members at remotely opposite ends of the members.

2. In a press, a pair of co-operating segmental presser members having arcuate pressure applying surfaces, said segmental members being mounted to turn about spaced parallel axes and having arcuate grooves, and means connecting the segmental presser members to each other to cause them to move in unison during a pressure applying operation, said connecting means being receivable in said grooves directly connected to the segmental presser members in sets at remotely opposite ends of the members and arranged to cross each other on the line of pressure.

3. In a press, a pair of co-operating segmental presser members having arcuate pressure applying surfaces, said segmental members being mounted to turn about spaced parallel axes and having arcuate grooves, and flexible inextensible cables connecting the segmental presser members directly to each other at points equally spaced from their axes and at substantial distances therefrom, the cables being arranged to travel in said grooves and to cause the segmental presser members to move together without slipping movement of the pressure applying surfaces relative to each other.

4. In a press, a pair of co-operating segmental presser members having circular cylindrical pressure applying surfaces, said segmental members being mounted to turn about spaced axes and being provided with circular grooves, means for causing oscillation of one of the segmental members, and inextensible cables receivable in said grooves and directly connecting that one of the segmental presser members to the other at equal distances from the axes of said members to drive one presser member from the other and to prevent slipping movement of the pressure applying surfaces relative to each other.

5. In a press, a pair of co-operating segmental presser members having circular cylindrical pressure applying surfaces, said segmental members being mounted to turn about spaced parallel axes and having peripheral circular grooves, and inextensible cables receivable in said grooves and connecting the segmental presser members to each other to cause them to move together without slipping movement of the pressure applying surfaces relative to each other.

6. In a press, a pair of co-operating segmental presser members having circular cylindrical pressure applying surfaces, said segmental members being mounted to turn about spaced parallel axes and having circular grooves, and flexible cables connecting the segmental presser members to each other and receivable in said grooves, certain of the cables being attached to front end portions of one segmental member and to rear end portions of the other segmental member.

7. In a machine for smooth plating and embossing pieces of leather, an upper and a lower segmental presser member having circular cylindrical surfaces for applying pressure to a piece of work placed between the surfaces, said segmental members being mounted to turn about spaced parallel axes and being provided with circular grooves, and flexible cable members receivable in said grooves and connecting the segmental presser members to each other constructed and arranged to prevent slipping movement of the pressure applying surfaces relative to each other, the flexible cables being arranged in two sets, the cables of one set being connected to front end portions of the upper segmental member and to rear end portions of the lower segmental member, and the cables of the other set being connected to front end portions of the lower segmental member and to rear end portions of the upper segmental member, the construction and arrangement being such that the two sets of cables cross in a line connecting the axes of the segmental members.

8. In a machine for smooth plating and embossing pieces of leather, a pair of co-operating segmental presser members provided with circular grooves and having circular cylindrical pressure applying surfaces, means arranged to cause rolling contact of the cylindrical surfaces with a piece of work interposed between them, and flexible cables having connections at both their ends with the segmental presser members to insure movement of the presser members in definite relation to each other, said cables being movable along circular grooves and being provided with adjusting and tensioning devices.

9. In a press, a pair of segmental presser members mounted to turn about spaced axes and having circular cylindrical pressure applying surfaces for operating upon opposite sides of a piece of leather, and yielding means located beyond the axis of one of the segmental members and movably backing that one of the segmental members so that it may yield with respect to the other segmental member without change in the length of its radius to accommodate variations in the thickness dimension of the piece of work while turning about its axis.

10. In a press, a pair of segmental presser members having circular cylindrical pressure applying surfaces for operating upon opposite sides of a piece of leather, a shaft for pivotally mounting each segmental member, bearings for the shafts, and yielding means movably backing one of the bearings so that the associated segmental member may yield with respect to the other segmental member to accommodate variations in the thickness dimension of the piece of work.

11. In a machine for smooth plating and embossing pieces of leather, a pair of segmental presser members having pressure applying surfaces for operating upon opposite sides of a piece of leather, a pair of rotary shafts each serving as a mounting for a segmental member, bearings for the shafts, and hydraulic means yieldingly backing the bearings of one of the shafts so that the associated segmental member may yield with respect to the other segmental member to accommodate variations in the thickness dimension of a piece of leather, said hydraulic means being operative also to apply pressure to its associated segmental member to secure the application of pressure to the piece of leather during movement of the segmental presser members relative thereto.

12. In a machine for smooth plating and embossing pieces of leather, a pair of segmental presser members having circular cylindrical pressure applying surfaces for operating upon opposite sides of a piece of leather, a pair of rotary shafts each serving as a mounting for a segmental member, bearings for the shafts, yielding means movably backing the bearings for one of the shafts so that the associated segmental member may yield with respect to the other segmental member to accommodate variations in the thickness dimension of a piece of leather, and cables connecting the segmental presser members, flexible to permit the yielding of one segmental member with respect to the latter and inextensible to hold the segmental members against slipping movement relative to each other during operation on a piece of work.

13. In a press, a pair of segmental presser members having arcuate pressure applying surfaces arranged for rolling movement of the arcuate surfaces in opposition to each other upon opposite sides of a piece of leather, a pair of rotary shafts each serving as a mounting for a segmental member, bearings for the shafts, means yieldingly backing the bearings of one of the shafts so that the associated segmental member may yield with respect to the other segmental member to accommodate variations in the thickness dimension of a piece of leather, and means for automatically controlling the first-mentioned means so as to apply full working pressure after the beginning of the rolling contact between the pressure applying surfaces of the segmental presser members and the work.

14. In a press, presser members for applying pressure upon opposite sides on a piece of work, one of the presser members being mounted for movement in a direction toward the other and also for pivotal movement about an axis parallel to the pressure applying surfaces of the presser members, means for moving the first-mentioned pressure member toward the other to apply pressure to the work, and means for controlling the first-mentioned means so that the pressure is gradually applied during initiation of the pivotal movement of the first-mentioned presser member.

15. In a press, segmental presser members having circular cylindrical pressure applying surfaces for operating upon opposite sides of a piece of work, mechanism for oscillating the presser members with the circular cylindrical surfaces in rolling contact with opposite surfaces of the work, means for causing one of the presser members to move toward the other to effect the application of pressure upon the work, and means for controlling the first-mentioned means for gradually applying the pressure at the initiation of the rolling contact between the two presser members and the work and for gradually releasing the pressure as the rear edge of the work is reached.

16. In a machine for smooth plating and embossing pieces of leather, segmental presser members having circular cylindrical pressure applying surfaces for operating upon opposite sides of a piece of work, power means for oscillating the presser members with the circular cylindrical surfaces in rolling contact with opposite surfaces of the work, fluid-operated means for causing one of the presser members to move toward the other to effect the application of pressure upon the work, and means controlled by one of the segmental presser members for applying the pressure through the fluid-operating means gradually at the initiation of rolling contact between the two segmental presser members and the work, and for gradually releasing the pressure at that edge of the work which is last engaged.

17. In a machine for smooth plating and embossing pieces of leather, segmental presser members having circular cylindrical pressure applying surfaces for operating upon opposite sides of a piece of work, power means for swinging the presser members, with the circular cylindrical surfaces in opposition to each other, fluid-operated means for causing relative approaching movement of the presser members to effect the application of pressure upon the work, and means controlled by one of the segmental presser members to effect gradual application of the pressure to that edge of the work which is first engaged and gradual withdrawal of pressure at that edge of the work which is last engaged.

18. In a machine for smooth plating and embossing pieces of leather, segmental presser members having circular cylindrical pressure applying surfaces for operating upon opposite sides of a piece of work, power means for oscillating the presser members with the circular cylindrical surfaces in rolling contact with opposite surfaces of the work, fluid-operated means for causing one of the presser members to move toward the other to effect the application of pressure upon the work, and means controlled by one of the segmental presser members for causing the application of pressure through the fluid-operated means gradually at the initiation of rolling contact between the two segmental presser members and the work.

19. In a machine for smooth plating and embossing pieces of leather, segmental presser members having circular cylindrical pressure applying surfaces for operating upon opposite sides of a piece of work, power means for swinging the presser members with the circular cylindrical surfaces in opposition to each other, fluid-operated means for causing one of the presser members to move toward the other to effect the application of pressure upon the work, and members mounted on one of the segmental presser members for controlling the application of pressure by the fluid-operated means to effect gradual application of the pressure to that edge of the work which is first engaged and gradual withdrawal of pressure at that edge of the work which is last engaged.

20. In a machine for smooth plating and embossing pieces of leather, segmental presser members having circular cylindrical pressure applying surfaces for operating upon opposite sides of a piece of work, power means for relatively oscillating the presser members with the circular cylindrical surfaces in rolling contact with opposite surfaces of the work, fluid-operated means for causing one of the presser members to move toward the other to effect the application of pressure upon the work, and means for automatically controlling the application of pressure through the fluid-operated means so that it is gradually applied at the initiation of the rolling contact between the presser members and the work.

21. In a machine for smooth plating and embossing pieces of leather, segmental presser members having circular cylindrical pressure applying surfaces for operating upon opposite sides of a piece of work, power means for relatively oscillating the presser members with the circular cylindrical surfaces in rolling contact with opposite surfaces of the work, fluid-operated means for causing one of the presser members to move toward the other to effect the application of pressure upon the work, and a manually operable member for controlling the fluid-operated means to cause the application of pressure in amounts in accordance with the judgment of the operator.

22. In a press, segmental presser members having pressure applying surfaces for operating upon opposite sides of a piece of work, power means for oscillating the presser members, fluid-operated means for causing one of the presser members to move toward the other to effect the application of pressure upon the work, and a manually operable member for controlling the fluid-operating means to cause the application and relief of pressure in accordance with the judgment of the operator.

23. In a machine for smooth plating and embossing pieces of leather, segmental presser members having circular cylindrical pressure applying surfaces for operating upon opposite sides of a piece of work, power means for oscillating the presser members with the circular cylindrical surfaces in rolling contact with opposite surfaces of the work, fluid-operated means comprising a valve for causing one of the presser members to move toward the other to effect the application of pressure upon the work, a lever for operating the valve, and cams on one of the presser members for operating the lever to control the application of pressure through the fluid-operated means so that it is gradually applied at the initiation of the rolling contact between the presser members and the work.

24. In a machine for smooth plating and embossing pieces of leather, segmental presser members having circular cylindrical pressure applying surfaces for operating upon opposite sides of a piece of work, power means for oscillating the presser members with the circular cylindrical surfaces in rolling contact with opposite surfaces of the work, fluid-operated means comprising a valve for causing one of the presser members to move toward the other to effect the application of pressure upon the work, a lever for operating the valve, a weight for moving the lever in one direction, and cams on one of the presser members for operating the lever to control the application of pressure through the fluid-operated means so that it is gradually applied at the initiation of the rolling contact between the presser members and the work.

25. In a machine for smooth plating and embossing pieces of leather, segmental presser members having circular cylindrical pressure applying surfaces for operating upon opposite sides of a piece of work, power means for oscillating the presser members with the circular cylindrical surfaces in rolling contact with opposite surfaces of the work, fluid-operated means comprising a valve for causing one of the presser members to move toward the other to effect the application of pressure upon the work, a lever for operating the valve, cams on one of the presser members for operating the lever to control the application of pressure through the fluid-operated means so that it is gradually applied at the initiation of the rolling contact between the presser members and the work, and a manually operable member for controlling the application of fluid pressure in accordance with the judgment of the operator.

26. In a press, a pair of segmental presser members having pressure applying surfaces for operating upon opposite sides of a piece of work, pivotal mountings for the presser members, power means for causing oscillation of the presser members, manually operable means for controlling said power means to start a pressure applying operation, and means controlled by one of the presser members for disconnecting the power means at the end of a pressure applying operation.

27. In a press, a pair of presser members members having pressure applying surfaces for operating upon opposite sides of a piece of work, power means for causing pressure applying operations of the presser members, manually operable means accessible from the front and rear of the machine for initiating operation of the power means, and means for locking the manually operable means from manipulation from the front and from the rear alternately so that only one operator at a time may control the machine.

28. In a press, a pair of presser members having pressure applying surfaces for operating upon opposite sides of a piece of work, power means for causing pressure applying operations of the presser members, manually operable means accessible to an operator at the front of the machine and similar manually operable means for an operator at the rear of the machine, both said manually operable means being constructed and arranged for initiating operation of the power means, and means automatically operative for locking first one and then the other of the manually operable means.

29. In a machine for smooth plating and embossing pieces of leather, a pair of presser members having pressure applying surfaces for operating upon opposite sides of a piece of work, power means for causing the presser members to apply pressure to the piece of work, manually operable means accessible to an operator at the front of the machine constructed and arranged for initiating operation of the power means and similar manually operable means for an operator at the rear of the machine, and a sliding bar automatically operated to lock alternately the front and the rear manually operable means.

30. In a machine for smooth plating and embossing pieces of leather, a pair of presser members having pressure applying surfaces for operating upon opposite sides of a piece of work, power means for causing the presser members to apply pressure to the piece of work, manually operable means accessible to an operator at the front of the machine constructed and arranged for initiating operation of the power means, similar manually operable means for an operator at the rear of the machine, and means controlled by one of the presser members for locking alternately the front and the rear manually operable means for controlling the power means of the machine.

31. In a machine for smooth plating and embossing pieces of leather, a pair of segmental presser members having pressure applying surfaces for operating upon opposite sides of a piece of work, pivotal mountings for the presser members, means for causing the presser members to oscillate about their pivotal mountings to apply pressure to the piece of work, a manually operable member accessible to an operator at the front and another for an operator at the rear of the machine both constructed and arranged for initiating operation of the presser members, a detent for locking the manual members alternately against operation, and a member arranged to be operated by one of the presser members for causing operation of the detent in properly timed relation to the movements of the presser members.

32. In a machine for smooth plating and embossing pieces of leather, a pair of segmental presser members having pressure applying surfaces for operating upon opposite sides of a piece of work, pivotal mountings for the presser members, power means for causing the presser members to oscillate about their pivotal mountings to apply pressure to the piece of work, manually operable means accessible to an operator at the front and to an operator at the rear of the machine both constructed and arranged for initiating operation of the power means, and automatically operated means to lock the front manually operable means when the segmental members are swung to the rear and to lock the rear manually operable means when the segmental members are swung to the front of the machine.

33. In a machine for smooth plating and embossing pieces of leather, a pair of segmental presser members having pressure applying surfaces for operating upon opposite sides of a piece of work, pivotal mountings for the presser members, power means for causing the presser members to oscillate about their pivotal mountings, said power means comprising a shaft, clutches on the shaft, a clutch lever, springs for acting on the lever to hold it and the clutches in neutral position, manually operable starting handles accessible respectively to an operator at the front and to an operator at the rear of the machine, and a rotary member arranged to be operated by either starting handle to move the clutch lever to cause engagement of one of the clutches to initiate power operation of the machine.

34. In a machine for smooth plating and embossing pieces of leather, a pair of segmental presser members having pressure applying surfaces for operating upon opposite sides of a piece of work, pivotal mountings for the presser members, power means for causing the presser members to oscillate about their pivotal mountings, said power means comprising a shaft, clutches on the shaft, spring means for putting the clutches out of action, a starting handle, a rocking device operable by the starting handle, and a draw bolt for co-operation with the rocking device to hold each clutch in turn in operation.

35. In a machine for smooth plating and embossing pieces of leather, a pair of segmental presser members having pressure applying surfaces for operating upon opposite sides of a piece of work, pivotal mountings for the presser members, power means for causing the presser members to oscillate about their pivotal mountings, said power means comprising a shaft, clutches on the shaft, spring means for putting the clutches out of action, a starting handle, a rocking device operable by the starting handle, a draw bolt for co-operation with the rocking device to hold each clutch in turn in operation, and operative connections between the draw bolt and one of the presser members to operate the draw bolt to initiate throwing out of the engaged clutch to stop the machine.

36. In a machine for smooth plating and embossing pieces of leather, a pair of presser members having pressure applying surfaces for operating upon opposite sides of a piece of work, pivotal mountings for the presser members, power means for causing the presser members to move about their pivotal mountings, a manually operable member accessible to an operator at the front of the machine constructed and arranged for initiating operation of the power means, a similar manually operable member for an operator at the rear of the machine, a sliding locking bar arranged to be operated by one of the presser members for alternately locking the front and the rear manually operable members, and manually operable means for initiating disconnection of the power means of the machine at any instant in the cycle.

37. In a machine for smooth plating and embossing pieces of leather, a pair of presser members having pressure applying surfaces for operating upon opposite sides of a piece of work, power means for causing the presser members to apply pressure to the piece of work, manually operable means accessible to the operator at the front of the machine constructed and arranged for initiating operation of the power means, similar manually operable means for the operator at the rear of the machine, and means automatically operative for causing disconnection of the power means of the machine from the presser members.

38. In a machine for smooth plating and embossing pieces of leather, a pair of presser members having pressure applying surfaces for operating upon opposite sides of a piece of work, power means for oscillating the presser members, manually operable means accessible to an operator at the front of the machine constructed and arranged for initiating operation of the power means and similar manually operable means for an operator at the rear of the machine, and a member arranged to be operated by the operator at the front of the machine and a similar member for the operator at the rear of the machine for initiating disconnection of the power means from the presser members.

39. In a machine for smooth plating and embossing pieces of leather, a pair of segmental presser members having circular cylindrical pressure applying surfaces for operating upon opposite sides of a piece of leather, a shaft for pivotally mounting each segmental member, means for oscillating the associated segmental members about their pivotal shafts to cause rolling contact of the circular cylindrical surfaces with a piece of work interposed between them, and hydraulic means for applying pressure during the rolling contact between the piece of work and the pressure applying surfaces of the segmental presser members.

40. In a press, segmental presser members having pressure applying surfaces for operating upon opposite sides of a piece of work, power means for oscillating the presser members, manually operable means for effecting coarse adjustment of the presser members toward and from each other, and fluid-operated means for causing one of the presser members to move toward the other to effect fine adjustment of the members to the work and application of pressure upon the work.

41. In a press, segmental presser members having pressure applying surfaces for operating upon opposite sides of a piece of work, power means for oscillating the segmental presser members, means for heating one of the pressure applying surfaces comprising a chamber for a heated fluid, and pipe connections leading to the chamber, said pipe connections having movable joints for permitting oscillatory movement of the heated presser member.

42. In a press, presser members for applying pressure upon opposite sides of the piece of work, one of the presser members being mounted for rotary movement and also for movement in a direction toward the other presser member, and means constructed and arranged to cause application of pressure to the rotary presser member a predetermined time after the beginning of the rotary movement of the latter.

43. In a press, presser members for applying pressure upon opposite sides of the piece of work, one of the presser members being mounted for rotary movement and also for movement in a direction toward the other presser member, and means controlled by the rotary presser member constructed and arranged to cause application of increased pressure to the rotary presser member a predetermined time after the beginning of rotary contact between the presser members.

44. In a press, presser members for applying pressure upon opposite sides of the piece of work, one of the presser members being mounted for rotary movement and also for movement in a direction toward the other presser member, and means actuated by the rotary presser member to cause alternately the application of pressure to the rotary presser member a predetermined time after the beginning of rotary movement of the latter and the release of said pressure a predetermined time before the termination of the rotary movement of the rotary presser member.

45. In a press, presser members for applying pressure upon opposite sides of a piece of work, one of the presser members being mounted for movement in a direction toward the other and also for rotary movement about an axis parallel to the pressure applying surfaces of the presser members, a cam member carried by the rotary presser member, and means controlled by the cam to cause the application of increased pressure to the rotary presser member a predetermined time after the beginning of rotary contact between the presser members.

46. In a press, presser members for applying pressure upon opposite sides of a piece of work, one of the presser members being mounted for movement in a direction toward the other and also for rotary movement about an axis parallel to the pressure applying surfaces of the presser members, means for rotating the rotary member alternately in opposite directions, cam members carried by the rotary presser member, and means controlled in succession by the cam members to cause alternately the application of pressure to the rotary presser member and the release of said pressure in timed relation to the rotary movement of the rotary presser member.

47. In a press, presser members for applying pressure upon opposite sides of a piece of work, one of the presser members being mounted for rotary movement and also for movement in a direction toward the other presser member, hydraulic mechanism operatively connected to the rotary presser member, and means for causing application of hydraulic pressure to the rotary presser member at a predetermined time after the start of its rotary movement.

48. In a press, presser member for applying pressure upon opposite sides of a piece of work, one of the presser members being mounted for rotary movement and also for movement in a direction toward the other presser member, hydraulic mechanism operatively connected to the rotary presser member, and means for causing alternately the application of hydraulic pressure to the rotary presser member and the release of said pressure in timed relation to the rotary movement of the said rotary member.

49. In a press, presser members for applying pressure upon opposite sides of a piece of work, one of the presser members having a circular cylindrical presser surface and being mounted for a movement in a direction toward the other presser member and also for rotary movement about its axis, hydraulic mechanism, and means controlled by the rotary presser member for causing the hydraulic mechanism to apply pressure to the rotary presser member.

50. In a press, presser members for applying pressure upon opposite sides of a piece of work, one of the presser members having a circular cylindrical presser surface and being mounted for movement in a direction toward the other presser member and also for rotary movement about an axis parallel to the pressure applying surfaces of the presser members, hydraulic mechanism, and means for causing the hydraulic mechanism to apply pressure to the rotary presser member in timed relation to the rotary movement of the latter.

51. In a machine for smooth plating and embossing pieces of leather, presser members for applying pressure upon opposite sides of a piece of work, one of the presser members being mounted for movement in a direction toward the other and also for rotary movement about an axis parallel to the pressure applying surfaces of the presser members, hydraulic mechanism operatively related to the rotary presser member, a valve for controlling the hydraulic mechanism, and means operated in timed relation to the rotary movement of the rotary presser member to control the valve, thereby to control the application of hydraulic pressure to the rotary presser member.

52. In a machine for smooth plating and embossing pieces of leather, presser members for applying pressure upon opposite sides of a piece of work, one of the presser members being mounted for movement in a direction toward the other and also for rotary movement about an axis parallel to the pressure applying surfaces of the presser members, hydraulic mechanism operatively related to the rotary presser member, and means controlled by the rotary presser member for automatically causing the hydraulic mechanism to apply pressure to the rotary presser member in timed relation to the rotary movement of the rotary presser member.

53. In a machine for smooth plating and embossing pieces of leather, presser members for applying pressure upon opposite sides of a piece of work, one of the presser members being mounted for rotary movement and also for movement in a direction toward the other presser member, hydraulic mechanism for moving the rotary presser member toward the other presser member to apply pressure to the work, and means for automatically initiating operation of the hydraulic mechanism in timed relation to the rotary movement of said rotary presser member.

54. In a machine for smooth plating and embossing pieces of leather, presser members for applying pressure upon opposite sides of a piece of work, one of the presser members being mounted for rotary movement and also for movement in a direction toward the other presser member, hydraulic mechanism for moving the rotary presser member toward the other presser member to apply pressure to the work, and means controlled by the rotary presser member for automatically causing application of hydraulic pressure to the rotary presser member and also release of said pressure in timed relation to the rotary movement of the rotary presser member.

55. In a machine for smooth plating and embossing pieces of leather, presser members for applying pressure upon opposite sides of a piece of work, one of the presser members being mounted for movement in a direction toward the other and also for rotary movement about an axis parallel to the pressure applying surfaces of the presser members, hydraulic mechanism for moving the rotary presser member toward the other presser member to apply pressure to the work, a valve for controlling the hydraulic mechanism, and cams mounted on the rotary presser member for operating the valve to cause initiation of hydraulic pressure with respect to the rotary presser member and also release of such pressure in timed relation to the rotary movement of the rotary presser member.

In testimony whereof I have signed my name to this specification.

GUSTAV ADOLF SCHETTLER.